(12) United States Patent
Mies et al.

(10) Patent No.: US 9,065,742 B2
(45) Date of Patent: Jun. 23, 2015

(54) SNOOPING IN SAS EXPANDER NETWORKS

(75) Inventors: Carl Joseph Mies, Costa Mesa, CA (US); Joseph Harold Steinmetz, Costa Mesa, CA (US); Murthy Kompella, Costa Mesa, CA (US); Bruce Gregory Warren, Costa Mesa, CA (US)

(73) Assignee: EMULEX CORPORATION, Costa Mesa, CA (US)

( * ) Notice: Subject to any disclaimer, the term of this patent is extended or adjusted under 35 U.S.C. 154(b) by 1680 days.

(21) Appl. No.: 11/966,922

(22) Filed: Dec. 28, 2007

(65) Prior Publication Data
US 2009/0168654 A1 Jul. 2, 2009

(51) Int. Cl.
H04L 12/26 (2006.01)
H04L 29/08 (2006.01)

(52) U.S. Cl.
CPC ............... *H04L 43/12* (2013.01); *H04L 43/18* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 2006/0129733 A1* | 6/2006 | Sobelman | 710/305 |
| 2006/0230218 A1* | 10/2006 | Warren et al. | 710/315 |
| 2006/0242312 A1* | 10/2006 | Crespi et al. | 709/230 |
| 2008/0010409 A1* | 1/2008 | Rao et al. | 711/118 |
| 2008/0267192 A1* | 10/2008 | Blinick et al. | 370/395.7 |
| 2008/0270638 A1* | 10/2008 | Blinick et al. | 710/12 |

* cited by examiner

Primary Examiner — Mohammad Adhami
(74) Attorney, Agent, or Firm — McAndrews, Held & Malloy Ltd.

(57) ABSTRACT

Snooping in SAS expander networks is disclosed. Ports in a SAS expander may include snoop circuitry and a snoop tap which allows snoop data to be diverted for snooping prior to any significant transformation of the traffic by the regular port logic. Furthermore, the snoop circuitry can receive OOB signaling and convert it to K characters for transmission through the SAS network and subsequent analysis by a protocol analyzer. The ports and cascades in the expander network can be configured to create snoop paths to enable snoop data to be passed through the network to locations where a protocol analyzer can be easily attached. With SAS snoop ports, there is no disruption to the system. Because only a copy of the data is routed to the analyzer, there is no change to the original signal path and latency is identical with or without the analyzer.

33 Claims, 9 Drawing Sheets

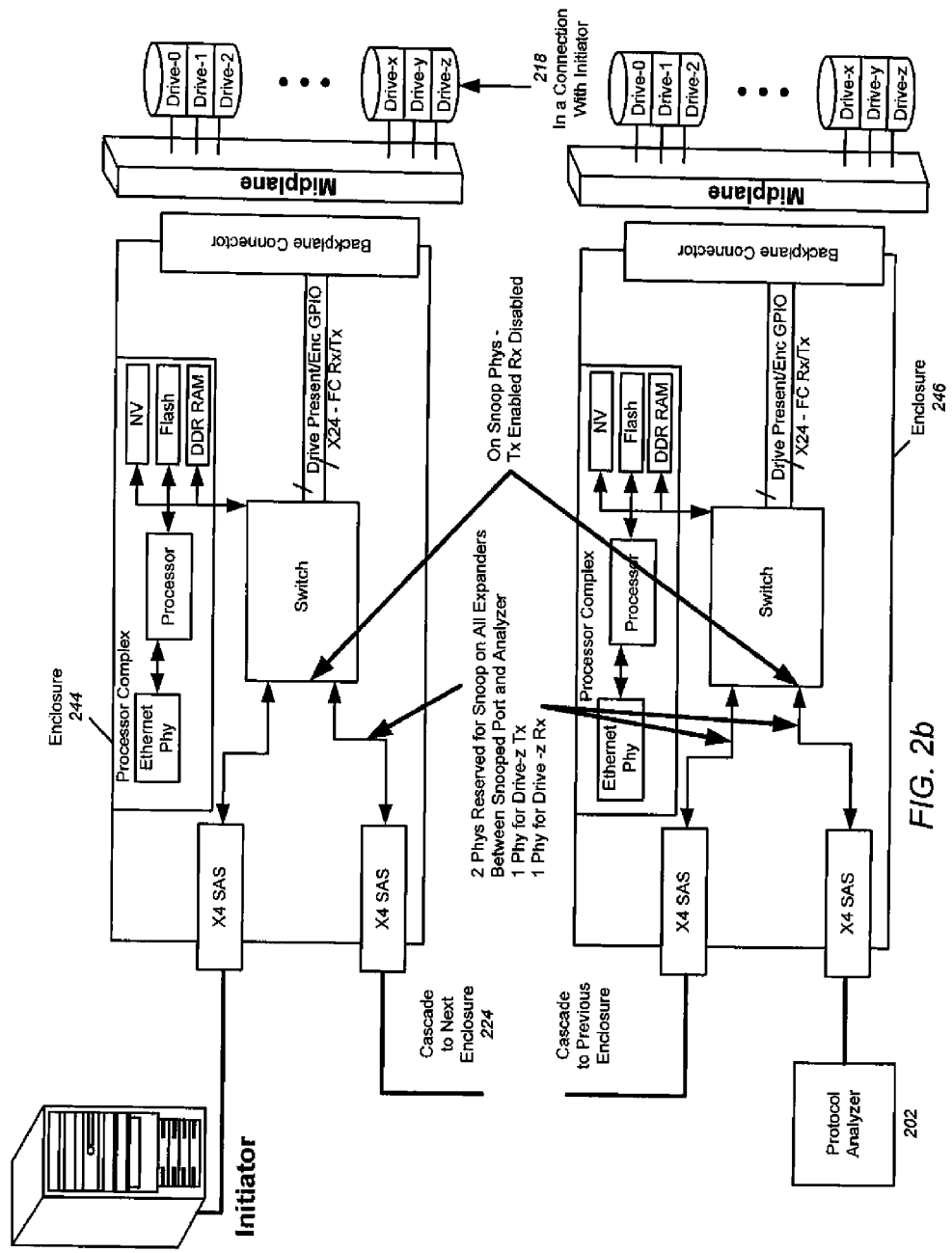

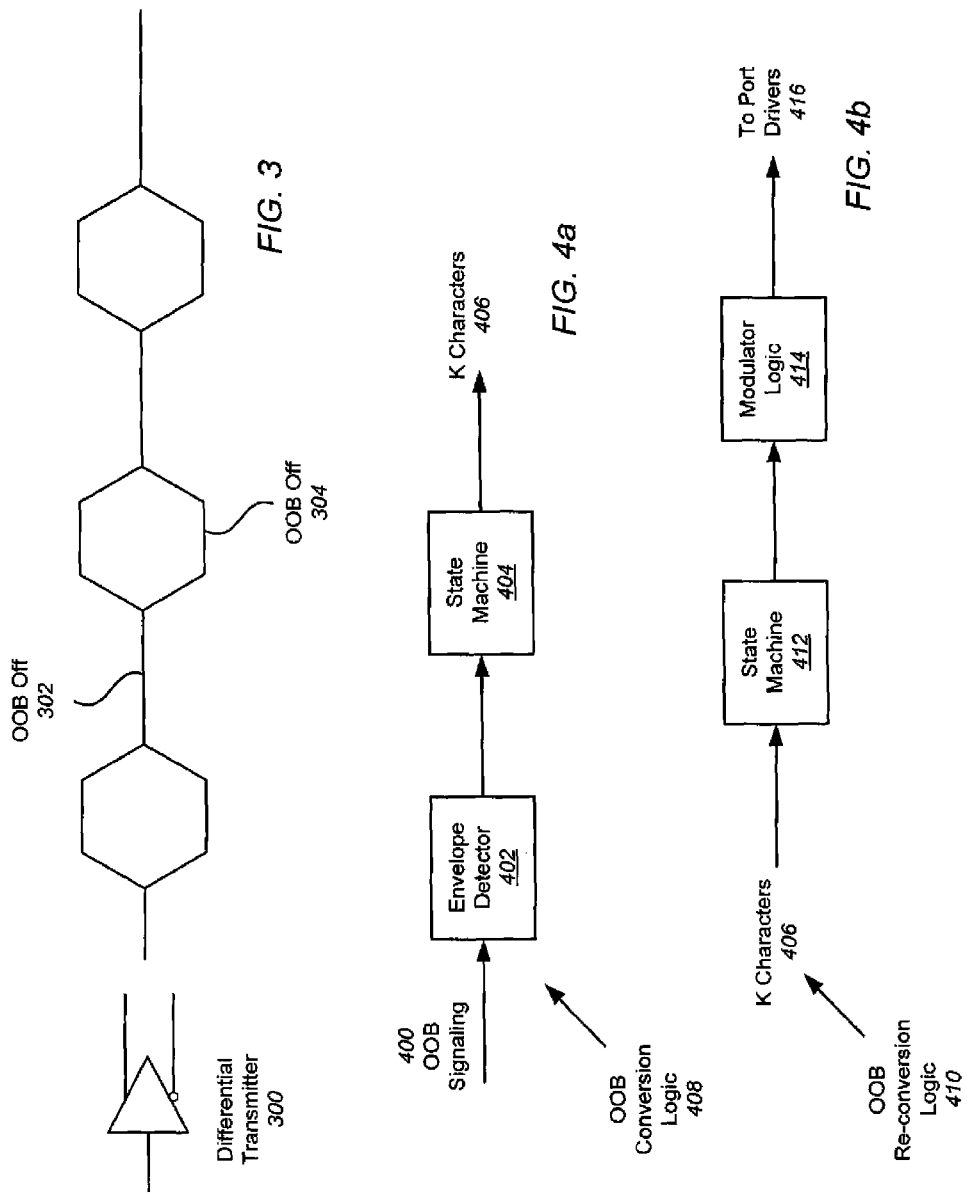

SNOOPING IN SAS EXPANDER NETWORKS

FIELD OF THE INVENTION

This invention relates to snooping of communication signals, and more particularly to the snooping of out-of-band (OOB) and regular traffic in Serial Attached SCSI (SAS) expander networks.

BACKGROUND OF THE INVENTION

In the context of data communications, snooping is a term used to refer to the monitoring of signals, often for the purpose of troubleshooting. In a simple case, snooping can be performed by breaking the connection to be monitored, adding in an analyzer in-line with the connection, and monitoring the traffic. One limitation of snooping is that access to the connection is needed, which may be difficult or impossible in monolithic configurations such as RAID servers, blade servers, and the like, where the desired connection to be monitored may be located in a midplane between the drive and the enclosure controller card. Because the drive is physically inserted into the enclosure and connected through a midplane to the enclosure controller, it can difficult or impossible to insert analyzer probes into the connection. Another drawback of in-line snooping is that the analyzer can create re-timing issues, add latency, and can change the behavior of a signal, at least in terms of timing. Additionally, by breaking the connection to insert an analyzer, the very problem to be detected can disappear or be altered.

In current Fibre Channel (FC) switch technology, snoop ports and monitoring circuitry can be utilized within the switch ASIC to redirect data paths to side paths for monitoring. This capability sends a copy of the data received or sent on one port or Phy to another identified Phy within the ASIC, the snoop Phy, in real time. The data is an exact copy of the sent or received data with the exception of fill words as required by slight speed differences in devices. This is done without modifying the original information in any way. This capability is valuable in storage systems because it enables troubleshooting a system using an analyzer without the need to modify the cabling of the system. An additional benefit is that the analyzer is not connected in-line with the devices of interest and does not modify the signal in any way.

However, SAS is different from FC in several key respects. First, unlike FC, SAS utilizes OOB sequences, which are low frequency signals detectable by a low frequency envelope detection mechanism and used to perform device detection, speed negotiation, etc. These OOB sequences cannot be monitored on conventional FC snoop port, which is not set up for low frequency envelope detection. Furthermore, in FC, snooping is available only for those devices directly attached to a port on the switch. Conventional FC snooping techniques and mechanisms cannot be extended to allow the passing of snoop data through a SAS expander network, or the attachment of an analyzer to one expander for snooping on a port in another expander. In addition, the use of wide ports with multiple cascades in SAS networks allows transactions to be sent down different cascades in an unpredictable fashion, making it difficult to monitor those ports without missing traffic. SAS also utilizes logical (a.k.a. virtual) Phy to provide management interfaces to the processor within a SAS expander, but conventional FC snooping techniques and mechanisms cannot be extended to snoop on logical Phy using snoop ports. SAS ports may also include an STP-SATA bridge for connecting to Serial ATA (SATA) devices, which modifies traffic and renders conventional FC snoop port technology ineffective due to the transformation of the traffic.

SUMMARY OF THE INVENTION

Embodiments of the invention are directed to snooping in SAS expander networks. Ports in a SAS expander may include snoop circuitry and a snoop tap which allows snoop data to be diverted for snooping prior to any significant transformation of the traffic by the regular port logic. Furthermore, the snoop circuitry can receive OOB signaling and convert it to K characters for transmission through the SAS network. In accordance with SMP commands from an initiator which are processed by the expander's firmware, the ports and cascades in the expander network can be configured to create snoop paths to enable snoop data to be passed through the network to locations where a protocol analyzer can be easily attached. In particular, because of the added bandwidth made possible by wide ports in SAS, paths (cascades) can be dedicated to enable remote snooping. Thus, a drive directly attached to one expander can be snooped by a protocol analyzer directly attached via a readily available expansion port to a different expander.

With SAS snoop ports, there is no disruption to the system. The analyzer is connected to any accessible SAS port and the SAS expanders (switches) are configured to route a copy of the data to these ports for analysis. Since only a copy of the data is routed to the analyzer, there is no change to the original signal path and latency is identical with or without the analyzer. With SAS snoop ports, any Phy within the system can be monitored and both the transmit (Tx) and receive (Rx) signals sent to an analyzer for troubleshooting.

To perform snooping using a protocol analyzer, the ports in the path from the snoop location to the analyzer are configured as various forms of snoop ports. If snooping of regular traffic is desired, the ports may be configured to be snoop tap ports (which utilize snoop taps on the port to pass snoop data to the switch core) or snoop pass-thru ports (which simply pass snoop data). The snoop tap port can tap off the Tx and Rx traffic between an expander and the device to be snooped, and send them to the switch core of the expander, which can then route the snoop data through snoop pass-thru ports and cascades until it is send out to the protocol analyzer.

If OOB snooping is desired, the ports may be configured as snoop conversion ports (which convert OOB signals to K characters), snoop pass-thru ports (which simply pass snoop data), or snoop reconversion ports (which reconvert K characters to OOB signaling). The snoop conversion port can convert OOB signals to K characters and send them to the switch core of the expander, which can then route the K characters through snoop pass-thru ports and cascades until it reaches a snoop reconversion port. The snoop reconversion port converts the K characters back into OOB signaling and sends the OOB signaling out to a protocol analyzer.

BRIEF DESCRIPTION OF THE DRAWINGS

FIG. 2b illustrates an exemplary application of remote snoop porting according to embodiments of the invention.

FIG. 3 illustrates a differential transmitter in a port and OOB signaling.

FIG. 4a illustrates exemplary OOB conversion logic according to embodiments of the invention.

FIG. 4b illustrates exemplary OOB reconversion logic according to embodiments of the invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the invention are directed to snooping in SAS expander networks. Ports in a SAS expander may include snoop circuitry and a snoop tap which allows snoop data to be diverted for snooping prior to any significant transformation of the traffic by the regular port logic. Furthermore, the snoop circuitry can receive OOB signaling and convert it to K characters for transmission through the SAS network. In accordance with SMP commands from an initiator which are processed by the expander's firmware, the ports and cascades in the expander network can be configured to create snoop paths to enable snoop data to be passed through the network to locations where a protocol analyzer can be easily attached. In particular, because of the added bandwidth made possible by wide ports in SAS, paths (cascades) can be dedicated to enable remote snooping. Thus, a drive directly attached to one expander can be snooped by a protocol analyzer directly attached via a readily available expansion port to a different expander.

With SAS snoop ports according to embodiments of the invention, there is no disruption to the system. The analyzer is connected to any accessible SAS port and the SAS expanders (switches) are configured to route a copy of the data to these ports for analysis. Since only a copy of the data is routed to the analyzer, there is no change to the original signal path and latency is identical with or without the analyzer. With SAS snoop ports, any Phy within the system can be monitored and both the transmit (Tx) and receive (Rx) signals sent to an analyzer for troubleshooting.

One artifact of remote snooping is that because the snoop data can pass through a number of expanders, each with a different reference clock, these clocks may get offset over time, and the clock rate matching logic inside the ports may insert an extra ordered set into the OOB snoop data stream. When snooping on regular data traffic, an extra fill word may be inserted by one of the expanders in the network for clock rate matching between expanders.

Although embodiments of the invention may be described herein in terms of SAS (SSP, SMP and STP) for purposes of simplifying the disclosure, it should be understood that embodiments of the invention are not so limited, but cover any scalable switch (expander) based network.

Figure 1:
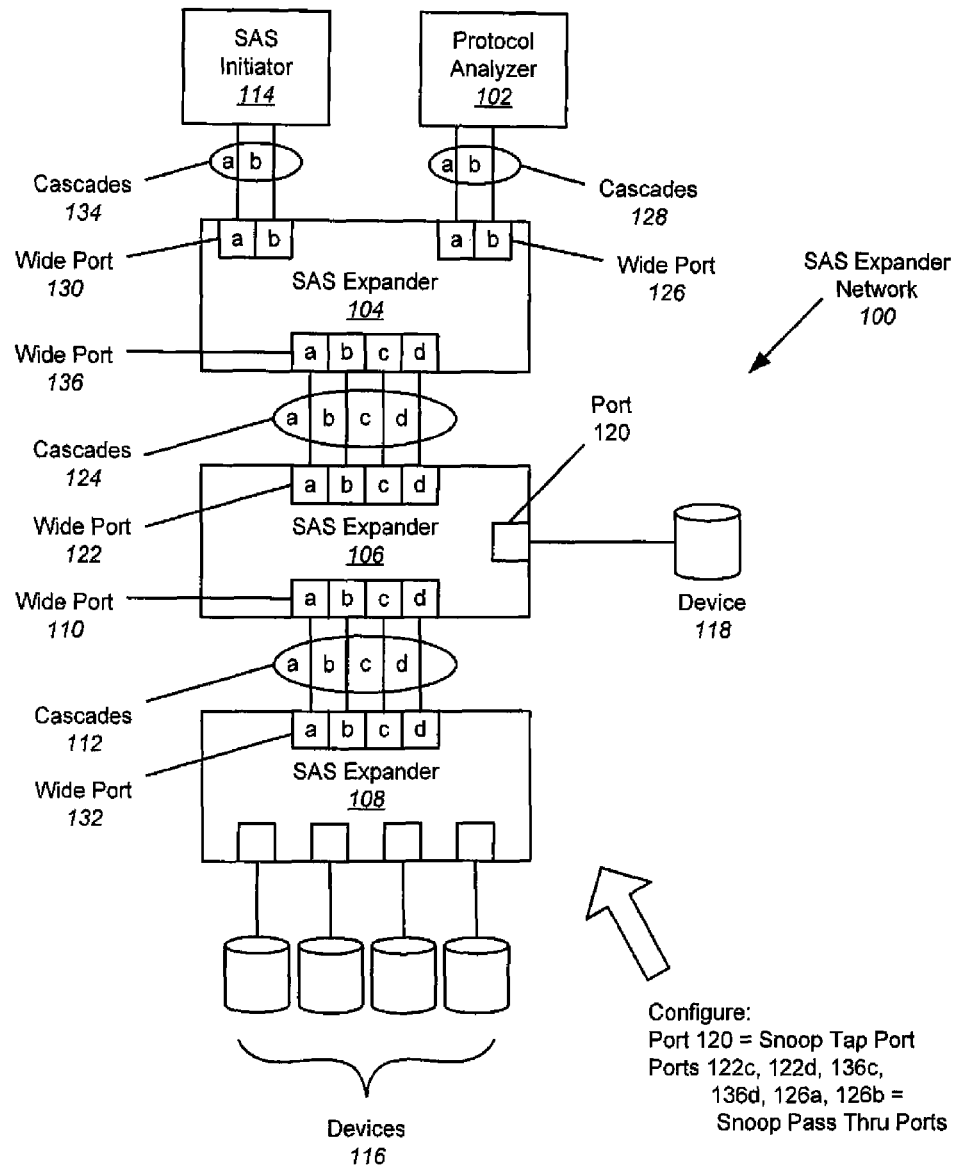
FIG. 1 illustrates an exemplary SAS expander network implementing SAS snooping of regular traffic according to embodiments of the invention.

FIG. 1 illustrates an exemplary SAS expander network 100 implementing SAS snooping of regular traffic according to embodiments of the invention. In FIG. 1, a protocol analyzer 102 and a SAS initiator 114 are connected to ports on expander 104. Initiator 114 is connected to expander 104 through cascades 134a and 134b and wide port 130 (formed from two ports 130a and 130b). Protocol analyzer 102 is connected to expander 104 through cascades 128a and 128b and wide port 126 (formed from two ports 126a and 126b). Expander 104 is connected to expanders 106 and 108 through cascades 124a-124d and 112a-112d and wide ports 136, 122, 110 and 132 (each formed from four ports 136a-136d, 122a-122d, 110a-110d and 132a-132d, respectively). Devices 116 are connected to ports on expander 108. Device 118 is directly attached to expander 106 through port 120. Now suppose a problem with device 118 is detected. It may be desirable to snoop on the traffic between device 118 and expander 106. However, because device 118 may be inserted directly into a midplane connector, it may be difficult to insert an analyzer between the device and the expander 106.

Therefore, to perform snooping using protocol analyzer 102, a system administrator or other user using initiator 114 or other management entity can send commands to the expander network (using, for example, the SAS management protocol (SMP) or other protocols if the expanders are connected via other means such as the Ethernet), to temporarily configure the network so that port 120 is configured as a snoop tap port, ports 122c, 122d, 136c and 136d are configured as snoop pass-thru ports (reserving cascades 124c and 124d for snooping), and ports 126a and 126b are also configured as snoop pass-thru ports. Processors within the expanders execute firmware to configure the ports in accordance with the commands. In particular, a port configured to be a snoop tap port utilizes snoop taps on the port to pass snoop data to the switch core. A port configured to be a snoop pass-thru port is reserved for snooping, and snoop data is passed through the port logic of that port just like regular traffic.

Note that two cascades may be needed to pass snoop traffic through the network, one to carry the Tx traffic and one to carry the Rx traffic. However, with connection multiplexing, two 3G data streams can be transmitted on a single 6G link. This functionality is defined in the SAS 2.0 specification. This capability can be used with Phy snooping to transmit both the Tx and Rx information on a specific Phy on one 6G connection. Any two 3G data steams can be sent on the 6G connection, receive data from two different Phys, transmit data from two different Phys or receive data from one Phy and transmit data on a different Phy.

Once the system is configured, snoop tap port 120 can tap off the Tx and Rx traffic between expander 106 and device 118 and send them to the switch core of the expander, which can then route the snoop data through snoop pass-thru ports 122c and 122d and cascades 124d and 124d to snoop pass-thru ports 136c and 136d on expander 104. Expander 104 can then route the snoop data to snoop pass-thru ports 126a and 126b, which simply pass the snoop data out to protocol analyzer 102 through cascades 128a and 128b. Note that as the snoop data is passed up to the analyzer 102, it does not disturb any other traffic, because cascades 124c and 124d have been reserved for snooping and therefore do not carry any other traffic.

It should be understood that although the example of FIG. 1 only shows the remote snooping of port 120 across an adjacent expander and the reservation of two cascades 124c and 124d for snooping, in other configurations snooping can be implemented directly (not remotely), or remote snooping can be accomplished across any number of expanders. For example, a port on expander 104 can be directly snooped without the need to dedicate any cascades to snooping (except for cascades 128a and 128b, which are connected to the analyzer and are always dedicated to snooping). Alternatively, ports on expander 108 (e.g. the ports connected to devices 116) could be snooped, in which case cascades 112c and 112d could be dedicated to snooping along with cascades 124c and 124d.

Figure 2A:
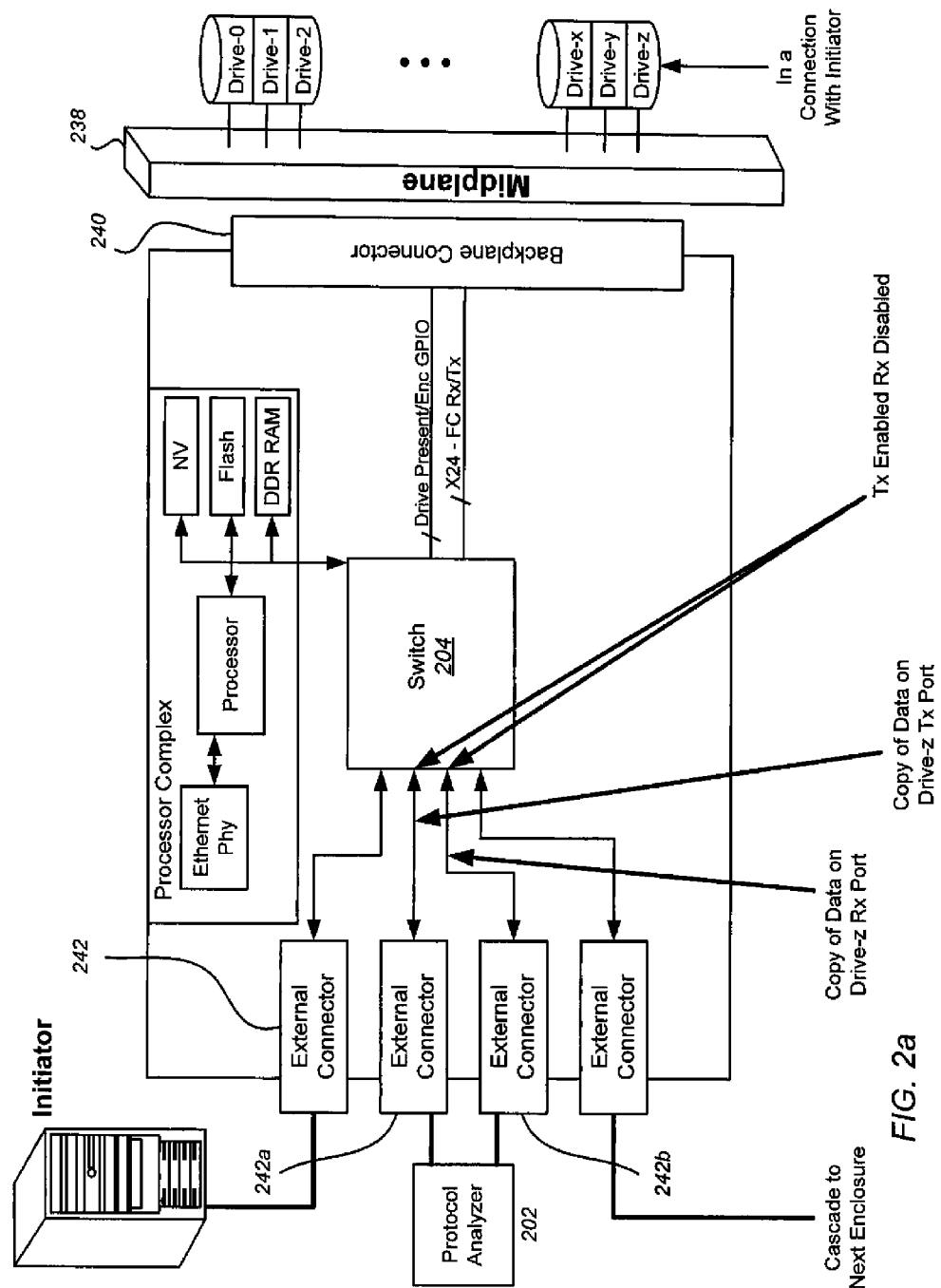
FIG. 2a illustrates an exemplary application of snoop ports to an enclosure controller according to embodiments of the invention.

FIG. 2a illustrates an exemplary application of snoop ports to an enclosure controller according to embodiments of the invention. In an enclosure such as the one depicted in FIG. 2a, ports connected through backplane connector 240 to midplane 238 and devices 240 are not directly accessible to an analyzer. However, some ports are routed to external connectors 242. In FIG. 2a, two of the external connector 242a and 242b are connected to an analyzer 202. The switch (expander) 204 can be configured to have one of the externally available ports snoop the Tx of a device to be monitored and another snoop the Rx port of the device to be monitored. With this approach, the analyzer trace will contain the traffic seen by the drive being monitored, including the possible insertion and deletion of fill words as required by the switch elastic store.

FIG. 2b illustrates an exemplary application of remote snoop porting according to embodiments of the invention. As described above, remote snooping is the ability to connect an analyzer into the system at any point where there are available connectors and route the snoop copy of the data to this port through the infrastructure. In FIG. 2b, Drive Z 218 of the first enclosure 244 is being monitored by the protocol analyzer 202 connected to another enclosure 246. In order to get the copy of the data, the first enclosure 244 is configured to snoop the Tx of Drive Z 218 onto one of the Phys for the cascade 224 and the Rx of Drive Z onto another Phy of the cascade so that the snoop data can be forwarded to the next enclosure. Each of the subsequent enclosures can also be configured to route the snoop data through to the last enclosure 246. The enclosure 246 with the protocol analyzer 202 attached then routes the signals to the Phys connected to the analyzer. The routing in all of the switches is static and the Phys used for the snoop traffic are not available to other traffic while being used for snooping.

Instead of the in-band handshaking utilized in EC, SAS and SATA utilize OOB signaling to provide initial information to the expanders that is independent of link speed. SAS OOB signaling is implemented by low-speed modulation of the physical link and envelope detectors to detect particular on/off sequences and perform various initialization functions. Various patterns of OOB signaling can be detected to indicate certain information.

FIG. 3 illustrates a differential transmitter 300 in a SAS/SATA port. The differential transmitter 300 produces differential signals on its outputs. During OOB signaling, an OOB "off" signal 302 is represented by differential voltage levels on the differential pair that are almost zero, within about 80 mV of each other. In contrast, an OOB "on" signal 304 is represented by nearly full range differential voltage levels. Because the OOB signaling is very low frequency as compared to regular in-band SAS transmissions, during the OOB "on" state, normal data transmissions in the form of SAS ordered sets can be transmitted.

To perform OOB snooping according to embodiments of the invention, a port that has been configured as a snoop conversion port can activate a low speed envelope detector that detects OOB on and off signals and converts the OOB sequences into particular K characters (K characters not presently defined in SAS), which are control characters in the form of encoded words. In particular, one K character can represent the OOB "off" state and another K character can represent the OOB "on" state. The K characters are then transmitted in-band by the snoop conversion port through the expander architecture to a port that has been configured as a snoop reconversion port, which is typically connected to the analyzer. The snoop reconversion port converts the K characters back to the original OOB sequences by modulating the amplitude of the differential signal being output by the snoop reconversion port.

FIG. 4a illustrates exemplary OOB conversion logic 408 according to embodiments of the invention. In FIG. 4a, OOB signaling 400 is detected by envelope detector 402. The detected envelopes and their timing is processed in state machine 404, where the envelope sequences are converted into K characters 406, which can then be passed through the SAS infrastructure.

FIG. 4b illustrates exemplary OOB reconversion logic 410 according to embodiments of the invention. In FIG. 4b, K characters 406, which have been passed through the SAS infrastructure, are processed by state machine 412 to regenerate the envelope sequences. Modulation logic 414 receives these envelope sequences and produces control signals 416 which are sent to the port driver circuitry to modulate the amplitude of the transmitted signals and regenerate the OOB signaling.

Figure 5:
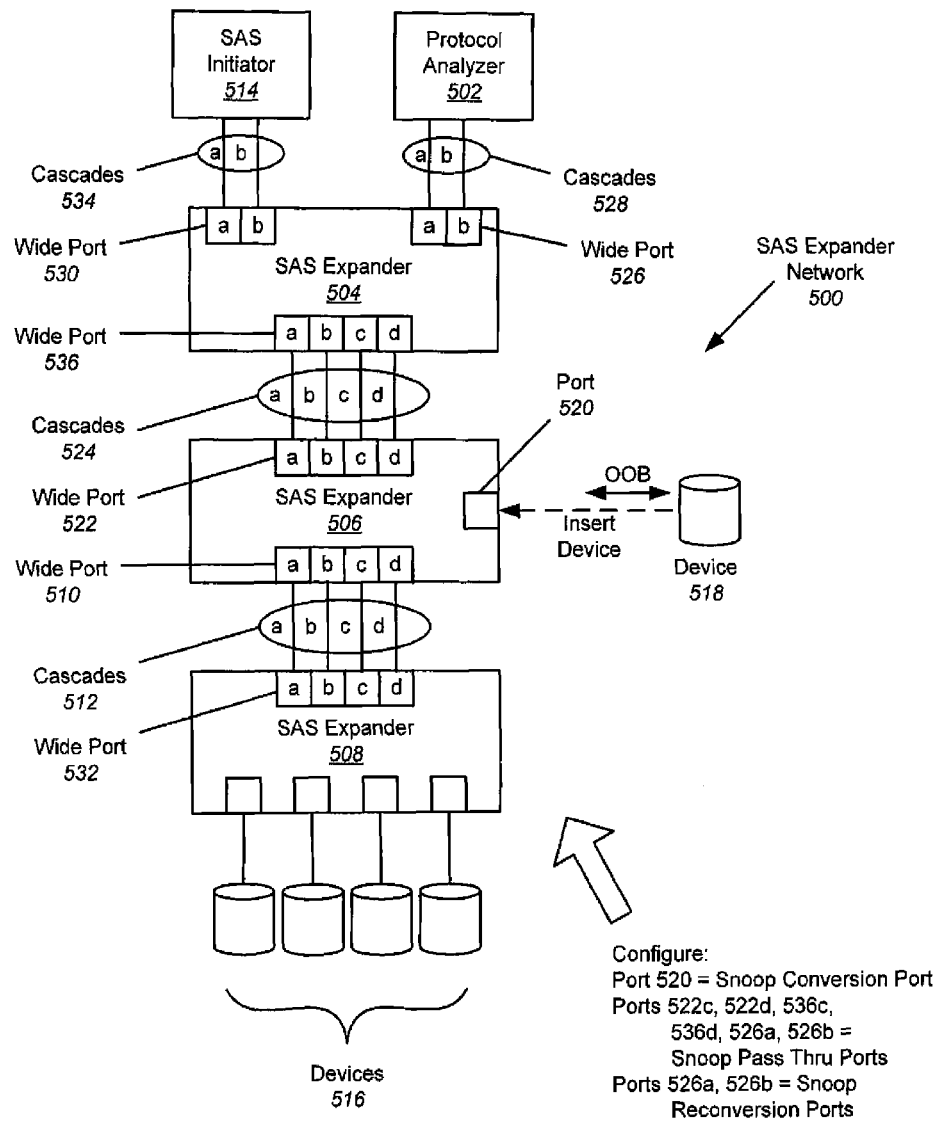
FIG. 5 illustrates an exemplary SAS expander network implementing SAS snooping of OOB signaling according to embodiments of the invention.

FIG. 5 illustrates an exemplary SAS expander network 500 implementing SAS snooping of OOB signaling according to embodiments of the invention. In FIG. 5, a protocol analyzer 502 and a SAS initiator 514 are connected to ports on expander 504. Initiator 514 is connected to expander 504 through cascades 534a and 534b and wide port 530 (formed from two ports 530a and 530b). Protocol analyzer 502 is connected to expander 504 through cascades 528a and 528b and wide port 526 (formed from two ports 526a and 526b). Expander 504 is connected to expanders 506 and 508 through cascades 524a-524d and 512a-512d and wide ports 536, 522, 510 and 532 (each formed from four ports 536a-536d, 522a-522d, 510a-510d and 532a-532d, respectively). Devices 516 are connected to ports on expander 508. Now suppose device 518 is to be inserted into port 520 on expander 506. Upon insertion, OOB sequences such as COM_RESET signals and speed negotiations are exchanged between device 518 and expander 506. If the device 518 does not insert properly, it may be desirable to snoop on the OOB signaling between device 518 and expander 506. However, because device 518 may be inserted directly into a midplane connector, it may be difficult to insert an analyzer between the device and the expander 506.

Therefore, to perform OOB snooping using protocol analyzer 502, a system administrator or other user using initiator 514 or other management entity can send commands to the expander network (using, for example, the SAS management protocol (SMP) or other protocols if the expanders are connected via other means such as the Ethernet), to temporarily configure the network so that port 520 is configured as a snoop conversion port, ports 522c, 522d, 536c and 536d are configured as snoop pass-thru ports (reserving cascades 524c and 524d for snooping), and ports 526a and 526b are configured as snoop reconversion ports. Note that one or two cascades may needed to pass OOB snoop traffic through the network, depending on whether snooping of OOB signaling in one or both directions is desired. Configuration commands are sent to the various expanders, and firmware within the expanders configures the ports in accordance with the commands. A port configured to be a snoop conversion port utilizes conversion logic and snoop taps on the port to generate and pass OOB snoop K characters to the switch core. A port configured to be a snoop pass-thru port reserves that port for snooping, and the OOB snoop K characters are passed through the port logic just as regular traffic is passed through the port logic. A port configured to be a snoop reconversion port utilizes reconversion logic to regenerate the OOB sequences and modulate the output of the driver.

Once the system is configured, snoop conversion port 520 can tap off the OOB signaling between expander 506 and device 518 and generate the OOB snoop K characters. The OOB snoop K characters can then be directed through the snoop taps on port 520 to the switch core, which can route the OOB snoop K characters through snoop pass-thru ports 522*c* and 522*d* and cascades 524*d* and 524*d* to snoop pass-thru ports 536*c* and 536*d* on expander 504. Expander 504 can then route the OOB snoop K characters to snoop reconversion ports 526*a* and 526*b*, which can regenerate the OOB signaling and pass it to protocol analyzer 502 through cascades 528*a* and 528*b*. Note that as the OOB snoop K characters are passed up to the analyzer 502, it does not disturb any other data transmissions, because cascades 524*c* and 524*d* have been reserved for snooping and therefore do not carry any data transmissions.

It should be understood that although FIG. 5 only shows the remote snooping of port 520 across an adjacent expander and the reservation of two cascades 524*c* and 524*d* for snooping for purposes of simplifying the disclosure, in other embodiments snooping can be implemented directly (not remotely) or across any number of expanders. For example, a port on expander 504 can be directly snooped without the need to dedicate any cascades to snooping (except for cascades 528*a* and 528*b*, which are connected to the analyzer and are always dedicated to snooping). In addition, ports on expander 508 (e.g. the ports connected to devices 516) could be snooped, in which case cascades 512*c* and 512*d* could be dedicated to snooping along with cascades 524*c* and 524*d*.

The expander network configuration may need to be changed each time a new port is to be snooped, but this typically does not present a problem because when snooping is needed, manual intervention is typically required anyway. Alternatively, if snooping is desired on a continuous basis, the SAS expander network can be programmed to automatically change its configuration to snoop different ports at different times. Multiple ports may be snooped at the same time, limited only by the number of cascades in the wide ports and the fact that two ports in an expander and two cascades between expanders may be needed, one to carry the port Tx to the analyzer, and one to carry the port Rx data to the analyzer. For example, if two expanders are connected by a wide port having four cascades, although it would be possible to reserve all four cascades for snooping, that would leave no cascades for concurrent data transmissions. For OOB snooping, it may be possible to use only one cascade if only the OOB signaling in a single direction is to be snooped.

Figure 6A:
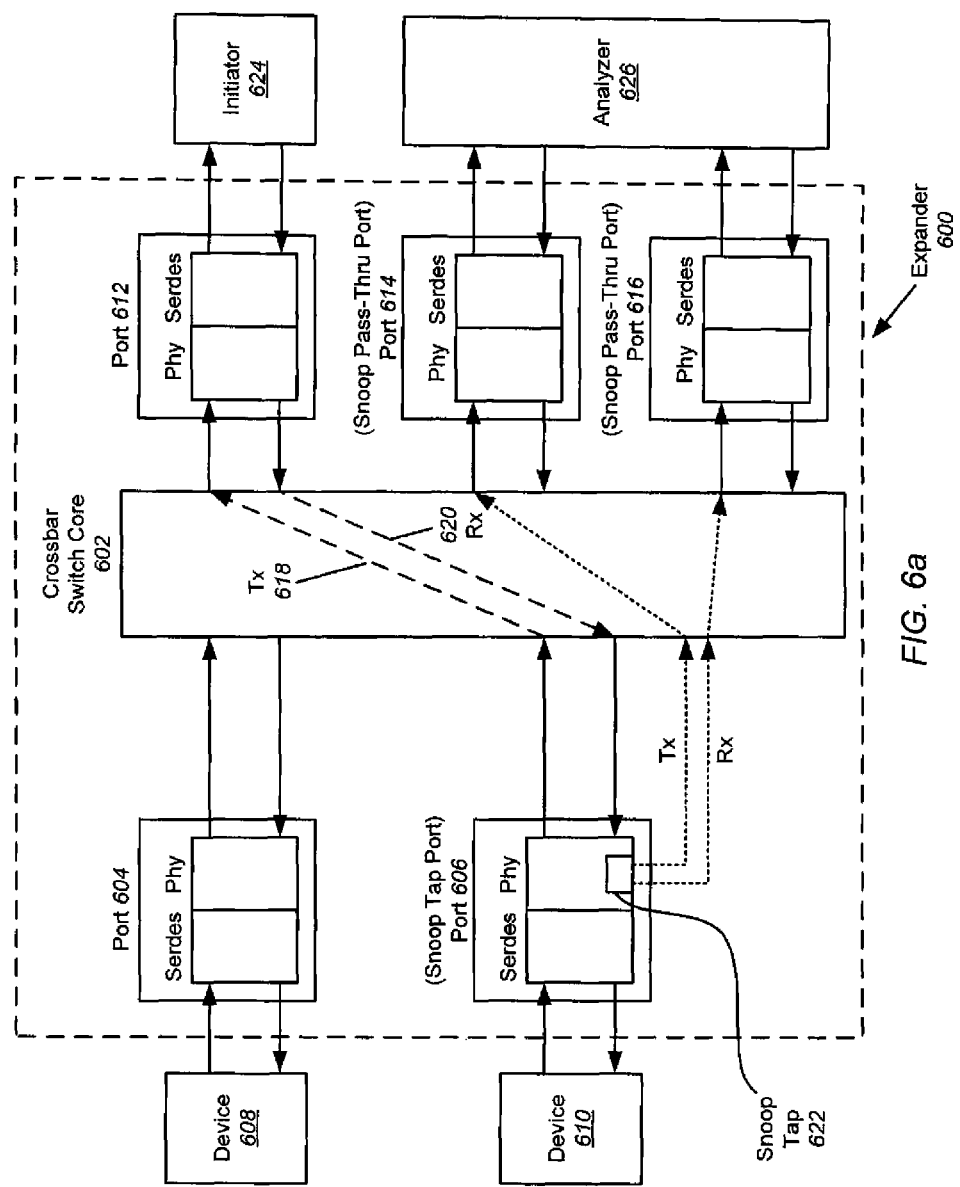
FIG. 6a illustrates an exemplary expander including a crossbar switch core and ports configurable for snooping according to embodiments of the invention.

FIG. 6*a* illustrates an exemplary expander 600 including a crossbar switch core 602 and ports configurable for snooping according to embodiments of the invention. Ports 604 and 606 are connected to devices 608 and 610 in the example of FIG. 6*a*. Port 612 is connected to initiator 624. Ports 614 and 616 are connected to protocol analyzer 626. Now suppose that Tx and Rx traffic from device 610 to the initiator 624 is to be snooped at port 606. As described above, port 606 can be configured to be a snoop tap port, and ports 614 and 616 are configured to be snoop pass-thru ports. In addition to routing traffic between the port 606 and the initiator 624 without disturbance (see 618 and 620), the crossbar switch core 602 receives the Rx and Tx traffic through snoop tap 622 on port 606 and routes it to snoop ports 614 and 616. Analyzer 626 can then analyze the Rx and Tx traffic. As mentioned above, the snoop tap 622 on port 606 enables the Tx and Rx traffic to be sent to the analyzer before it undergoes significant transformation such as primitive manipulation and other operations that change the nature of the signaling.

Figure 6B:
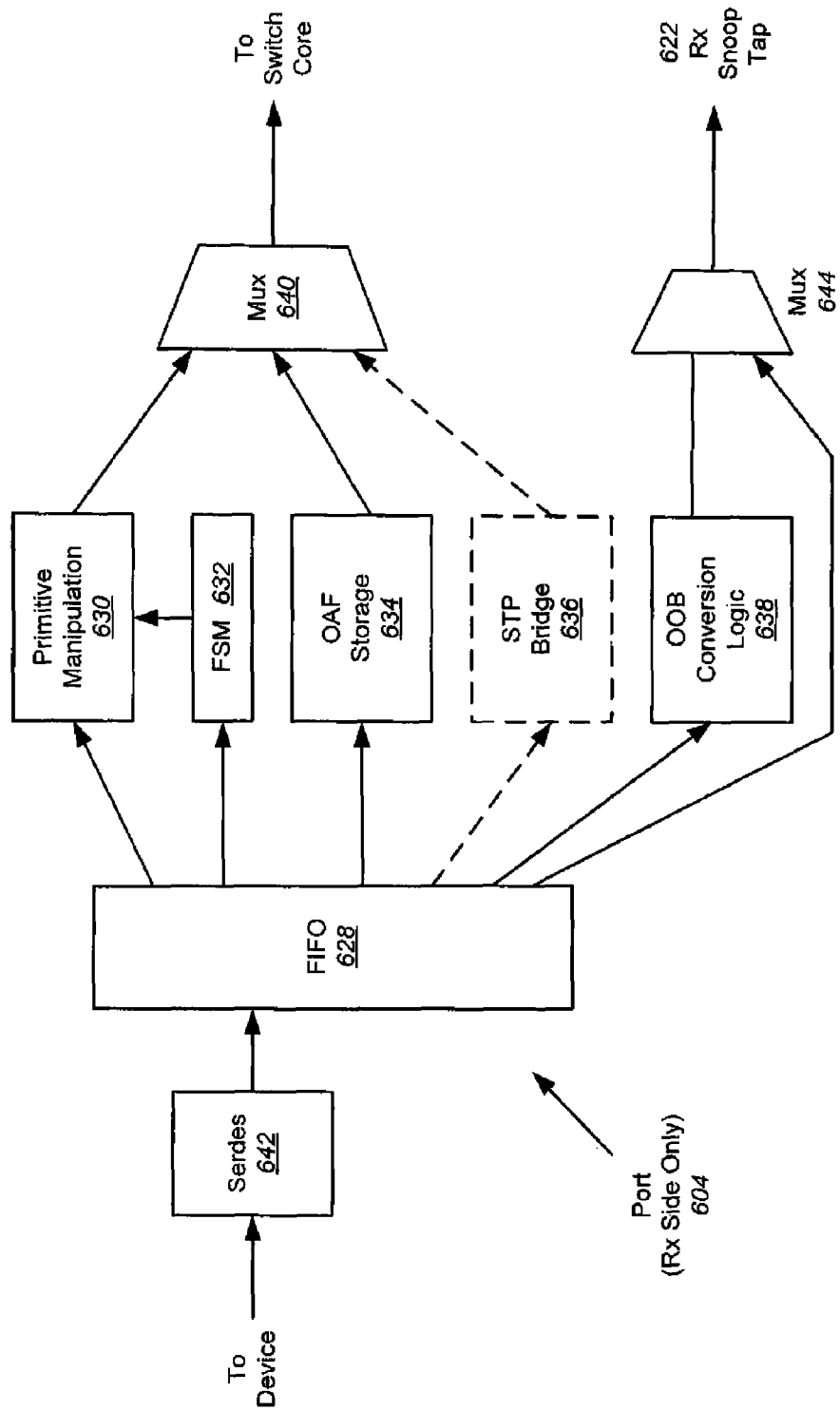
FIG. 6b illustrates an exemplary block diagram of the receive side of a port configurable for SAS snooping according to embodiments of the invention.

FIG. 6*b* illustrates an exemplary block diagram of the receive side of port 604 according to embodiments of the invention. In FIG. 6*b*, parallel data from Serdes 642 is first stored in a first-in-first-out (FIFO) buffer 628, which allows fill words to be inserted to perform the speed matching of clocks. The buffered parallel data may then undergo primitive manipulation in block 630. In parallel with primitive manipulation 630, the parallel data is processed by a finite state machine (FSM) 632, which monitors the data and may direct other operations on the data such as the exchange of primitives in block 630. The raw parallel data is also sent to open address frame (OAF) storage 634, which stores the 732-bit OAF used to request a connection. Because the OAF cannot be forwarded to the switch core until the connection has been made, the storage 634 holds the OAF until the connection is made. Additionally, if the attached device is a SATA device, the parallel data may pass through an SATA tunneling protocol (STP) bridge 636, which converts incoming SATA commands to STP data (representing a change in protocols). The outputs of the primitive manipulation block 630, OAF storage 634, and STP bridge 636 are all multiplexed using multiplexer 640, which selects the data to be presented to the switch core.

To avoid sending manipulated data to the snoop ports, the receive side of port 604 also includes OOB conversion logic 638 and multiplexer 644. If OOB signaling is being snooped, OOB conversion logic 638 monitors the rx_los from the Serdes to perform the envelope detection on the received OOB data stream, converts it to K characters, and forwards it to multiplexer 644. If regular traffic is being snooped, the raw parallel data from FIFO 628 is forwarded directly to multiplexer 644. The multiplexer selects the appropriate snoop data and sends it out on the receive side of snoop tap 622.

Note that the transmit side of port 604, although not shown for purposes of simplifying FIG. 6*b*, is similar to the receive side shown in FIG. 6*b*, and also includes OOB reconversion logic described above, used only when the port is configured as a snoop reconversion port. All ports in the expander network may be identically constructed so that any port can be configured to be a regular port, a snoop tap port, a snoop pass-thru port, a snoop conversion port, or a snoop reconversion port.

Figure 7:
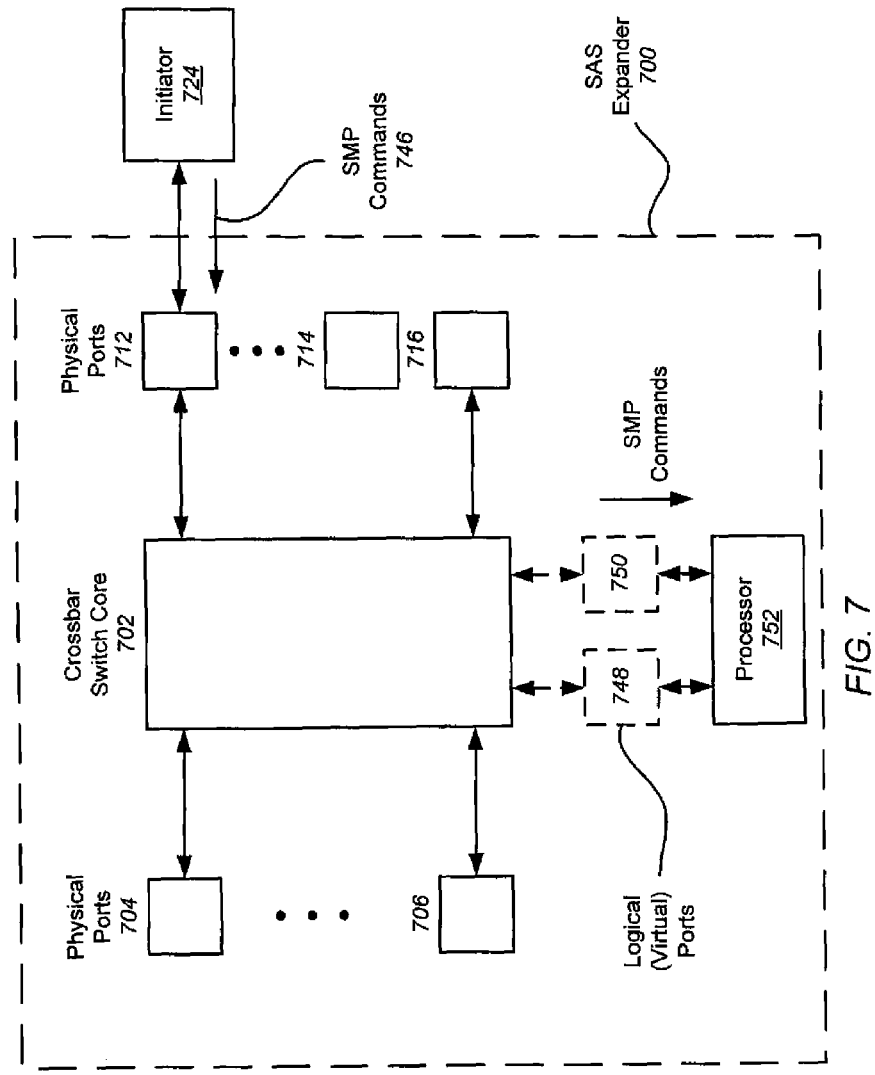
FIG. 7 illustrates an exemplary expander and the configuring of the expander ports for snooping according to embodiments of the invention.

FIG. 7 illustrates an exemplary expander 700 and the configuring of the expander ports for snooping according to embodiments of the invention. In FIG. 7, crossbar 702 is capable of connecting to physical ports 704, 706, 712, 714 and 716, and also to logical or virtual ports 748 and 750, which are connected to a processor 752 within the expander. In the example of FIG. 7, an initiator 724 is connected to port 712. Through initiator 724, a user can configure the expander by sending SMP commands 746 to the expander. The SMP commands are routed by the crossbar 702 to the processor 752 through one or both of logical ports 748 and 750. The SMP commands 746 can then be received by the processor 752 and used in conjunction with firmware to configure the ports as snoop tap ports, snoop pass-thru ports, snoop conversion ports, or snoop reconversion ports.

Figure 8:
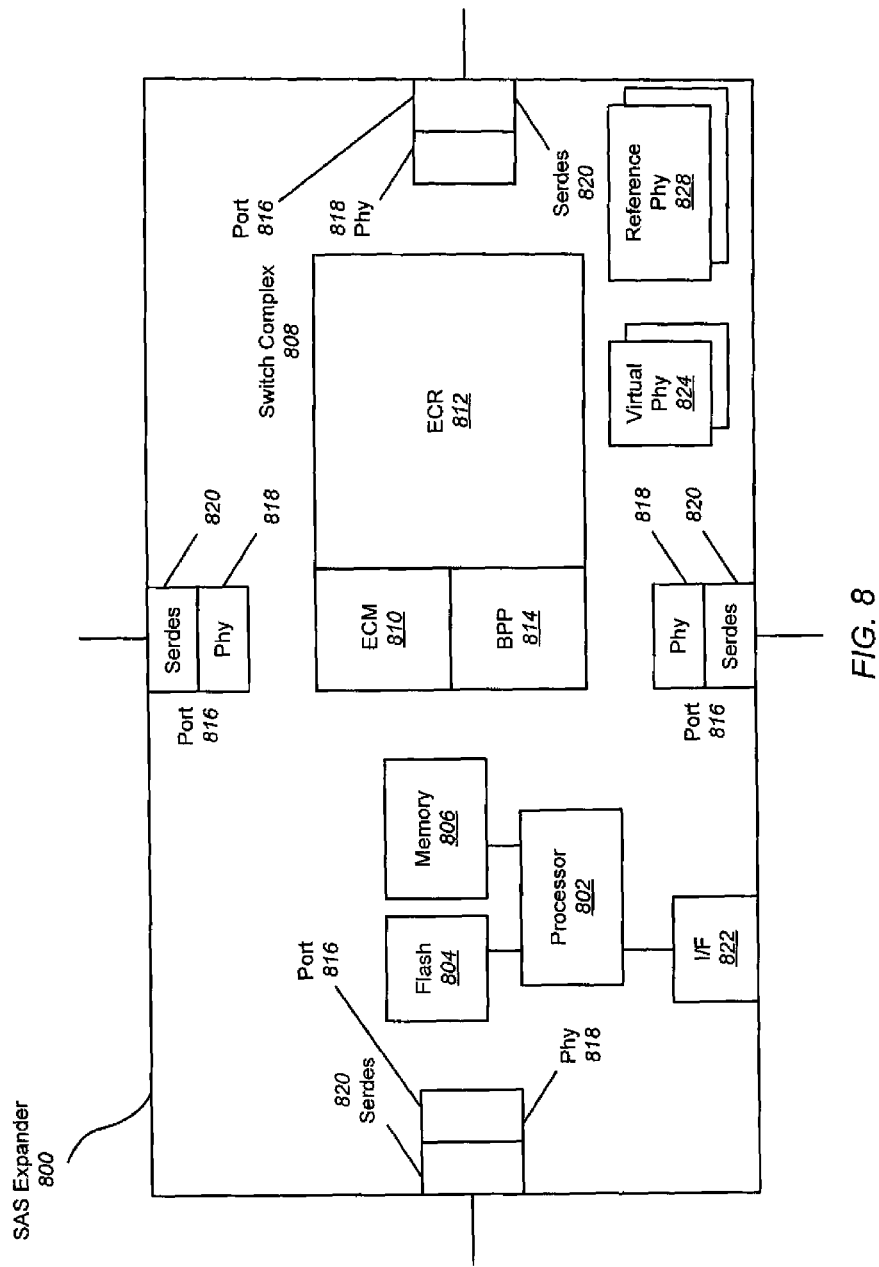
FIG. 8 illustrates an exemplary SAS expander employing snooping according to embodiments of the invention.

FIG. 8 illustrates an exemplary SAS expander 800 employing snooping according to embodiments of the invention. In FIG. 8, SAS expander 800 is shown with processor 802, flash 804, memory 806, and switch complex 808 including an expander connection manager (ECM) 810, expander connection router (ECR) 812, and broadcast primitive processor (BPP) 814. ECM 810 allows pathways to be built between two Phy. ECR 812 can include a crossbar switch, and makes and implements decisions regarding routing connections between Phy. BPP 814 propagates BCNs to all other ports in the SAS expander except the port that caused the BCN to be generated. SAS expander 800 also includes a plurality of ports 816, each including a Phy 818 and a serializer/deserializer (Serdes) 820, and an interface 822 for external out-of-band communications such as configuration commands from an administrator. It should be understood that the SAS expander of FIG. 8 shows four ports for simplicity, but that in other embodiments many more ports may be present.

Firmware residing in memory 806 or flash 804, which are forms of computer-readable media, can be executed by processor 804 to perform the operations described above. Note that this firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for remote snooping of traffic in a switch network, comprising:
    configuring a plurality of ports in the switch network for remote snooping, the plurality of ports comprising at least a first port on a first switch, a second port on a second switch, and one or more wide ports that operably couple the first and second switches, wherein:
        the first port on the first switch is configured as a snoop tap port,
        when converting data during said remote snooping:
            adaptively selecting at least one of the plurality of ports for configuration as a snoop conversion port, and
            adaptively selecting at least another one of plurality of ports for configuration as a snoop reconversion port, and
        each remaining one of the second port on the second switch and the one or more wide ports is configured as a snoop pass-thru port;
    tapping off snoop data from the first port on the first switch;
    routing the snoop data from the first port to the second port on the second switch through the one or more wide ports, the second port coupled to an analyzer for analyzing the snoop data; and
    performing an analysis of the snoop data in the analyzer.

2. The method of claim 1, the snoop data representing transmit (Tx) and receive (Rx) traffic on the first port, the method further comprising:
    configuring the first port as a snoop tap port to tap off the Tx and Rx traffic; and
    configuring the second port as a snoop pass-thru port to provide the snoop data at an output of the second port.

3. The method of claim 2, further comprising: configuring a third port on the first switch and a fourth port on the second switch as snoop pass-thru ports to reserve the third and fourth ports for snoop data.

4. The method of claim 2, further comprising tapping off the Tx and Rx traffic prior to any substantial primitive manipulation, addition of fill words for rate matching, or protocol conversion.

5. The method of claim 2, further comprising configuring the first and second ports by routing a port configuration command through a logical port to a switch processor in each of the first and second switches.

6. The method of claim 1, the snoop data being a representation of out-of-band (OOB) signaling on the first port, the method further comprising:
    configuring the first port as a snoop conversion port to detect the OOB signaling and convert the OOB signaling to K characters, the K characters being the representation of the OOB signaling; and
    configuring the second port as a snoop reconversion port to regenerate the OOB signaling at the second port from the K characters received at the second port.

7. The method of claim 6, further comprising: configuring a third port on the first switch and a fourth port on the second switch as snoop pass-thru ports to reserve the third and fourth ports for snoop data.

8. The method of claim 6, further comprising utilizing envelope detection to detect the OOB signaling.

9. The method of claim 6, further comprising configuring the first and second ports by routing a port configuration command through a logical port to a switch processor in each of the first and second switches.

10. The method of claim 1, wherein the switch network is a Serial Attached SCSI (SAS) network and the first and second switches are SAS expanders.

11. A switch for remote snooping of traffic in a switch network, comprising:
    a crossbar switch core;

one or more ports configured to be selectively coupled to the crossbar switch core, each of the one or more ports including:
   a snoop tap configured for tapping off snoop data, and snoop logic for enabling the port to be configured for snooping; and
a processor coupled to the crossbar switch core and the one or more ports for receiving a configuration command through the crossbar switch core to configure the one or more ports as snoop ports,
wherein:
   the snoop data is routed from one of the one or more configured snoop ports of the switch to a port in a second switch, through one or more wide ports that operably couple at least the first switch and the second switch,
   the port in the second switch is coupled to an analyzer configured for analyzing the snoop data,
   when converting data during said remote snooping:
      at least one of the one or more configured snoop ports, the port on the second switch, and the one or more wide ports is adaptively selected for configuration as a snoop conversion port, and
      at least another one of the one or more configured snoop ports, the port on the second switch, and the one or more wide ports is adaptively selected for configuration as a snoop reconversion port, and
      each remaining one of the port on the second switch and the one or more wide ports is configured as a snoop pass-thru port.

12. The switch of claim 11, the traffic representing transmit (Tx) and receive (Rx) traffic, the switch further comprising a first port configured as a snoop tap port to tap off the Tx and Rx traffic from the first port as the snoop data.

13. The switch of claim 12, further comprising a second port configured as a snoop pass-thru port to pass the snoop data through the second port.

14. The switch of claim 11, further comprising a first port configured as a snoop conversion port to detect OOB signaling and convert the OOB signaling to K characters, the K characters being a representation of the OOB signaling, and a second port configured as a snoop reconversion port to regenerate the OOB signaling at the second port from the K characters received at the second port.

15. The switch of claim 12, the snoop tap on each port configured for tapping off the Tx and Rx traffic prior to substantial primitive manipulation, addition of fill words for rate matching, or protocol conversion.

16. The switch of claim 12, further comprising a logical port coupled to the processor and the crossbar switch core and configured for providing access to the processor from the switch core.

17. The switch of claim 11, the traffic including out-of-band (OOB) signaling, the switch further comprising a first port configured as a snoop conversion port to detect the OOB signaling and convert the OOB signaling to K characters representing the snoop data.

18. The switch of claim 17, further comprising a second port configured as a snoop pass-thru port to pass the snoop data through the second port.

19. The switch of claim 17, further comprising a second port configured as a snoop reconversion port to regenerate the OOB signaling at the second port from the K characters received at the second port.

20. The switch of claim 17, each port further including an envelope detector to detect the OOB signaling.

21. The switch of claim 17, further comprising a logical port coupled to the processor and the switch core and configured for providing access to the processor from the switch core.

22. The switch of claim 11, wherein the switch is a Serial Attached SCSI (SAS) expander and the switch network is a SAS expander network.

23. The switch of claim 11, wherein the switch forms a part of a switch network.

24. A switch network for enabling remote snooping of traffic, comprising:
   a first switch having a first port configured as a snoop tap port for tapping off snoop data;
   a second switch having a second port configured for receiving the snoop data for analysis, the second port is coupled to an analyzer for analyzing the snoop data;
   one or more switching elements, comprising one or more wide ports for operably coupling the first and second switches; and
   one or more cascades for coupling the one or more wide ports, the first port of the first switch, and the second switch, and reserved for routing the snoop data from the first port to the second port;
wherein:
   when converting data during said remote snooping:
      at least one of the first port of the first switch, the second port of the second switch, and the one or more wide ports is adaptively selected for configuration as a snoop conversion port,
      and at least another one of the first port of the first switch, the second port of the second switch, and the one or more wide ports is adaptively selected for configuration as a snoop reconversion port, and
      each remaining one of the second port of the second switch and the one or more wide ports is configured as a snoop pass-thru port.

25. The switch network of claim 24, the snoop data representing transmit (Tx) and receive (Rx) traffic on the first port, the first port having a snoop tap for tapping off the Tx and Rx traffic from the first port as the snoop data, and the second port configured as a snoop pass-thru port to pass the snoop data through the second port.

26. The switch network of claim 25, further comprising:
   a third port on the first switch and a fourth port on the second switch, the third and fourth ports forming a part of the wide ports on the first and second switches, respectively, and configured as snoop pass-thru ports to reserve the third and fourth ports for snoop data;
   wherein at least one of the cascades is coupled between the third and fourth ports.

27. The switch network of claim 25, wherein the snoop tap is configured for tapping off the Tx and Rx traffic prior to substantial primitive manipulation, addition of fill words for rate matching, or protocol conversion.

28. The switch network of claim 25, each of the first and second switches further comprising a processor accessible through a logical port, the processor programmed for configuring the first and second ports in accordance with a configuration command received through the logical port.

29. The switch network of claim 24, the snoop data comprising out-of-band (OOB) signaling on the first port: the first port having a snoop tap for tapping off the OOB signaling, and configured as a snoop conversion port to detect the OOB signaling and convert the OOB signaling to K characters; and the second port configured as a snoop reconversion port to regenerate the OOB signaling at the second port from the K characters received at the second port.

30. The switch network of claim 29, further comprising: a third port on the first switch and a fourth port on the second switch, the third and fourth ports configured as snoop pass-thru ports to reserve the third and fourth ports for snoop data.

31. The switch network of claim 29, the first port further comprising an envelope detector to detect the OOB signaling.

32. The switch network of claim 29, each of the first and second switches further comprising a processor accessible through a logical port, the processor programmed for configuring the first and second ports in accordance with a configuration command received through the logical port.

33. The switch network of claim 24, wherein the first and second switches are Serial Attached SCSI (SAS) expanders and the switch network is a SAS expander network.

* * * * *